United States Patent
Cheng et al.

(12)

(10) Patent No.: US 12,395,520 B1
(45) Date of Patent: Aug. 19, 2025

(54) DETECTION OF ABNORMAL OPERATIONS IN CONNECTED VEHICLES

(71) Applicant: VicOne Corporation, Tokyo (JP)

(72) Inventors: Yi-Li Cheng, Taipei (TW); Chih-Kang Lu, Taipei (TW); Zhi-Wei Chen, Taipei (TW); Yi-Ting Chen, Taipei (TW)

(73) Assignee: VicOne Corporation, Tokyo (JP)

( * ) Notice: Subject to any disclaimer, the term of this patent is extended or adjusted under 35 U.S.C. 154(b) by 242 days.

(21) Appl. No.: 18/186,741

(22) Filed: Mar. 20, 2023

(51) Int. Cl.
*H04L 9/40* (2022.01)

(52) U.S. Cl.
CPC .............................. *H04L 63/1441* (2013.01)

(58) Field of Classification Search
None
See application file for complete search history.

(56) References Cited

U.S. PATENT DOCUMENTS

| | | | | |
|---|---|---|---|---|
| 2018/0295147 | A1* | 10/2018 | Haga | H04L 67/12 |
| 2019/0349394 | A1* | 11/2019 | Kishikawa | H04L 63/1416 |
| 2020/0226274 | A1* | 7/2020 | Juliato | H04L 12/4015 |
| 2021/0194921 | A1* | 6/2021 | Guajardo Merchan | G06F 8/65 |
| 2022/0171612 | A1* | 6/2022 | Goto | G06F 9/45533 |
| 2023/0247038 | A1* | 8/2023 | Haga | H04L 67/12 |
| | | | | 726/23 |

OTHER PUBLICATIONS

Matt Spencer, "How the SOAFEE Architecture Brings a Cloud-Native Approach to Mixed Critical Automotive Systems", https://armkeil.blob.core.windows.net/developer/Files/pdf/white-paper/arm-scalable-open-architecture-for-embedded-edge-soafee.pdf, Sep. 2021, downloaded Mar. 6, 2023.
Dylan Berger, "Auto Industry at Higher Risk of Cyberattacks in 2023", https://www.tripwire.com/state-of-security/auto-industry-higher-risk-cyberattacks, Aug. 2, 2022, downloaded Feb. 8, 2023.
"Data Distribution Service", https://en.wikipedia.org/w/index.php?title=Data_Distribution_Service&oldid=1124341688, Nov. 28, 2022, downloaded on Feb. 8, 2023.
"Middleware", https://en.wikipedia.org/wiki/Middleware, Mar. 27, 2023, downloaded Feb. 8, 2023.
"What is VSS?", https://covesa.github.io/vehicle_signal_specification/introduction/overview/, downloaded Feb. 8, 2023.

(Continued)

*Primary Examiner* — Brandon Hoffman
(74) *Attorney, Agent, or Firm* — Beyer Law Group LLP

(57) ABSTRACT

A connected vehicle has several electronic control units (ECUs). Entities running in different ECUs are constrained in corresponding security boundaries. Messages across security boundaries are transmitted over a connection that is not directly available to entities constrained in security boundaries. Messages across security boundaries between entities are inspected. A message from an entity in one security boundary to another entity in another security boundary is inspected by normalizing a content of the message, and comparing the normalized content to a baseline. A corrective action is performed against the message in response to determining that a difference between the normalized content and the baseline indicates a change that is prohibited by a security policy.

15 Claims, 8 Drawing Sheets

(56) References Cited

OTHER PUBLICATIONS

Cabe Atwell, "ROS 2 Explained: Overview and Features", https://www.electronicdesign.com/markets/automation/article/21214053/electronis-design-ros-2-explained-overview-and-features, Jan. 20, 2022, downloaded Feb. 21, 2023.
Dirk Thomas, "ROS 2 Middleware Interface", https://design.ros2.org/articles/ros_middleware_interface.html, Aug. 2014, downloaded Feb. 8, 2023.
"SOAFEE", https://www.soafee.io/, Copyright 2023, downloaded Mar. 6, 2023.
"Vehicle Signal Specification", https://covesa.github.io/vehicle_signal_specification/, downloaded Feb. 8, 2023.
"Zero Trust Security Model", https://en.wikipedia.org/wiki/Zero_trust_security_model, May 18, 2023, downloaded Feb. 8, 2023.

\* cited by examiner

DETECTION OF ABNORMAL OPERATIONS IN CONNECTED VEHICLES

TECHNICAL FIELD

The present disclosure is directed to automotive cybersecurity.

BACKGROUND

A connected vehicle can communicate with devices or systems that are external to the vehicle. Most new vehicles on the market today are connected in that they have modules that can perform external communication by wireless or wired connection. A connected vehicle may also have sensors for receiving sensed data of its physical environment.

Connected vehicles typically have a plurality of electronic control units (ECUs) that perform various functions. For example, a connected vehicle may have an ECU for the head unit, an ECU for engine management, an ECU for keyless entry, an ECU for side detection, etc. ECUs are computers with software and hardware components. More particularly, an ECU has a processor that executes software components, such as an operating system, application programs, and/or firmware. Due to the complexity of ECUs, an original equipment manufacturer (OEM) of a connected vehicle sources one or more ECUs and/or software components thereof from third-party suppliers.

Connected vehicles are susceptible to cyberattacks, which include unauthorized intrusion, malware infection, etc. Traditional information technology (IT) cybersecurity measures that may be implemented in connected vehicles include Ethernet intrusion detection and prevention system (IDPS), Controller Area Network (CAN)/Ethernet firewall, CAN intrusion detection system (IDS), system hardening (secure boot, system/files integrity), software bill of materials (SBOM) vulnerability monitoring, and endpoint detect and response with a vehicle security operations center. However, these different cybersecurity measures typically work separately and have to be separately integrated in each ECU or attack vector of the connected vehicle, increasing the complexity of their integration from the OEM or user point of view.

BRIEF SUMMARY

In one embodiment, a connected vehicle comprises a plurality of electronic control units (ECUs). A first ECU of the plurality of ECUs comprises a processor and a memory, the memory of the first ECU storing instructions that when executed by the processor of the first ECU cause the first ECU to constrain a first set of entities that are running in the first ECU to within a first security boundary. A second ECU of the plurality of ECUs of the connected vehicle comprises a processor and a memory, the memory of the second ECU stores instructions that when executed by the processor of the second ECU cause the second ECU to: (a) constrain a second set of entities to within a second security boundary; (b) receive all messages that are transmitted across the first and second security boundaries between entities over a connection that is not directly accessible to any of the first and second sets of entities; (c) inspect all messages that are transmitted across the first and second security boundaries between entities; (d) receive over the connection a target message for inspection, the target message being sent by a first entity of the first set of entities to a second entity of the second set of entities; (e) normalize a content of the target message to a target posture vector, the target posture vector indicating a current operation involving the second entity; (f) compare the target posture vector to a corresponding baseline posture vector, wherein the corresponding baseline posture vector indicates a known good operation involving the second entity; and (g) take a corrective action against the target message in response to determining that a difference between the target posture vector and the corresponding baseline posture vector indicates a change in cybersecurity posture that is prohibited by a security policy.

In another embodiment, a method of detecting abnormal operations in connected vehicles includes constraining a first entity in a first security boundary, the first entity being executed in a first ECU of a plurality of ECUs of a connected vehicle. A second entity is constrained in a second security boundary, the second entity being executed in a second ECU of the plurality of ECUs of the connected vehicle. All messages that are transmitted across the first and second security boundaries between entities are routed over a connection that is not directly accessible to the first entity or the second entity. All messages that are transmitted across the first and second security boundaries between entities are inspected. A target message is received in the first security boundary over the connection for inspection, the target message being sent to the first entity by the second entity. A content of the target message is normalized to a target posture vector, the target posture vector indicating a current operation involving the first entity. The target posture vector is compared to a corresponding baseline posture vector, wherein the corresponding baseline posture vector indicates a known good operation involving the first entity. A difference between the target posture vector and the corresponding baseline posture vector is determined. A corrective action is taken against the target message in response to determining that the difference between the target posture vector and the corresponding baseline posture vector indicates a change in cybersecurity posture that is prohibited by a security policy.

In yet another embodiment, a method of detecting abnormal operations in connected vehicles includes constraining a first entity within a first virtualized environment that is hosted by a first ECU of a plurality of ECUs of a connected vehicle. A second entity is constrained within a second virtualized environment that is hosted by a second ECU of the plurality of ECUs of the connected vehicle. All messages crossing the first and second virtualized environments between entities are transmitted over a connection that is not directly accessible to any entity that is constrained within the first virtualized environment or the second virtualized environment. All messages that are transmitted across the first and second virtualized environments between entities are inspected. A target message is received in the first virtualized environment for inspection, the target message being sent to the first entity by the second entity. A content of the target message is normalized to a target posture vector, the target posture vector indicating a current operation involving the first entity. The target posture vector is compared to a corresponding baseline posture vector, wherein the corresponding baseline posture vector indicates a known good operation involving the first entity. A corrective action against the target message is taken in response to determining that a difference between the target posture vector and the corresponding baseline posture vector indicates a change in cybersecurity posture that is prohibited by a security policy.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
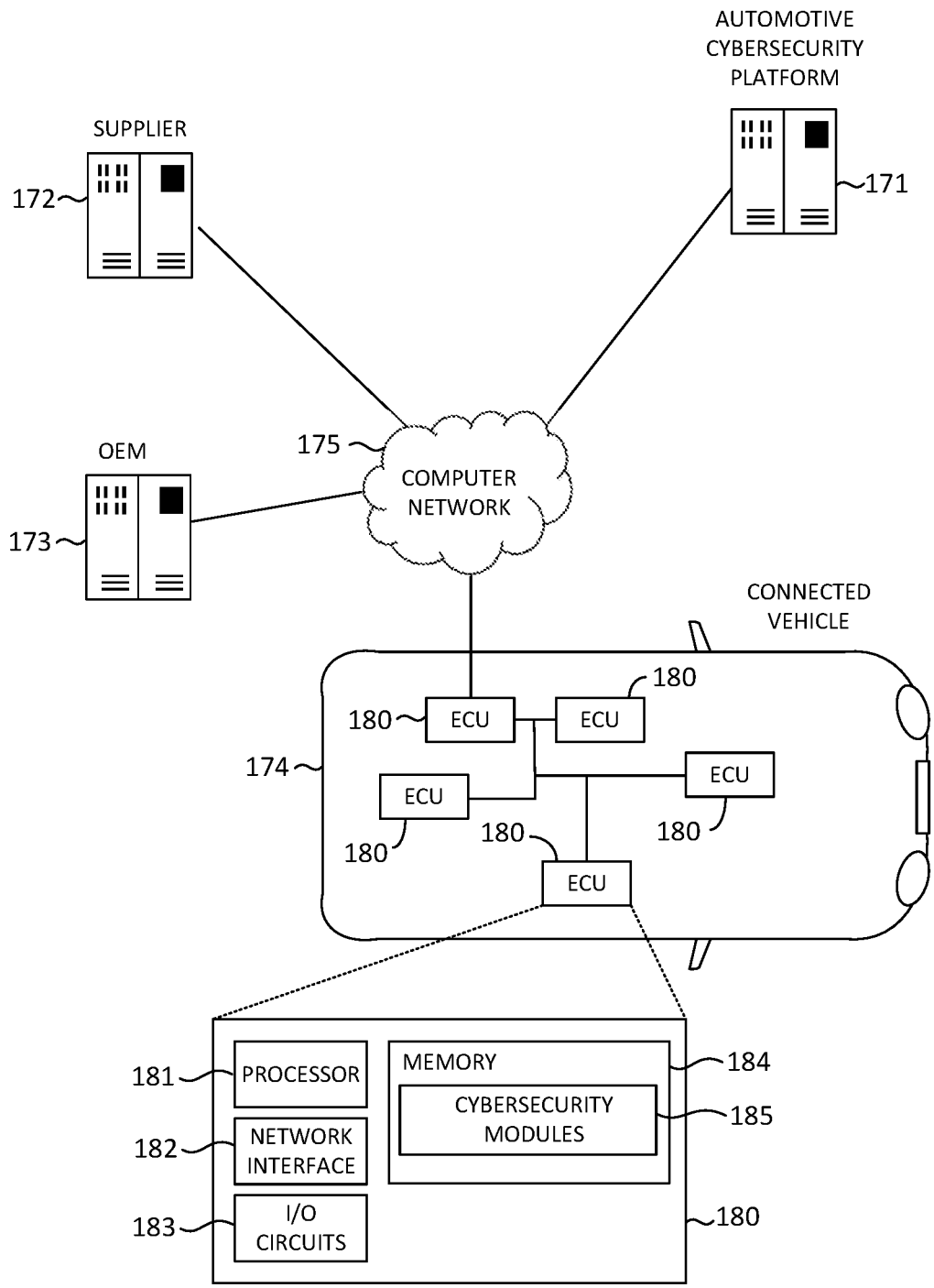
FIG. 1 is a block diagram of a connected vehicle in accordance with an embodiment of the present invention.

FIG. 1 is a block diagram of a connected vehicle 174 in accordance with an embodiment of the present invention. FIG. 1 shows a single connected vehicle 174, a single third-party supplier 172, and a single OEM 173 for illustration purposes only. As can be appreciated, there are many OEMs that manufacture connected vehicles that have modules sourced from many, different suppliers.

The connected vehicle 174 has a plurality of ECUs 180. An ECU 180 may be for a safety system, body system, chassis system, power system, telematic control unit (TCU), Global Navigation Satellite System (GNSS), vehicle-to-everything (V2X) interfaces, remote keyless entry, etc. One or more of the ECUs 180 and associated software components may be provided by the supplier 172 to the OEM 173, which is the manufacturer of the vehicle 174. The supplier 172 may provide firmware, source code, and/or other software components by removable storage media (e.g., Universal Serial Bus (USB) flash storage) or over a computer network 175, which includes the Internet in this example. Each of the OEM 173 and the supplier 172 is depicted as a computer system to indicate that the OEM 173 and the supplier 172 may send and receive software components and/or communicate with the connected vehicle 174 over the computer network 175.

An ECU 180 is a computer comprising a processor 181, a memory 184, one or more network interfaces 182 for connecting to an in-vehicle network and/or external computer network, and one or more input/output (I/O) circuits 183. An I/O circuit 183 may be a data acquisition and control circuit, a sensor interface, or other circuit for receiving external data, such as communications from other connected vehicles, sensed data of the environment outside the vehicle 174, etc. The memory 184 may be non-volatile memory (e.g., non-volatile random access memory (NVRAM)) or volatile memory (e.g., dynamic random access memory (DRAM)). Instructions of one or more cybersecurity modules 185 and other software components of the ECU 180 may be stored in the memory 184 for execution by the processor 181.

An ECU 180 may be connected to other ECUs 180 over an in-vehicle (i.e., internal to the vehicle 174) network, such an Ethernet network or a Controller Area Network (CAN) bus. An ECU 180 may communicate with external devices outside of the vehicle 174 by way of a V2X network or a suitable vehicle ad-hoc network (VANET).

An automotive cybersecurity platform 171 may comprise one or more computer systems for supporting cybersecurity operations in one or more connected vehicles. The automotive cybersecurity platform 171 may serve as a vehicle security operations center for the vehicle 174. In the example of FIG. 1, the cybersecurity modules 185 may be created at the automotive cybersecurity platform 171 and provided to the vehicle 174 over the computer network 175, by removable storage media (e.g., USB flash storage), or at the factory by the OEM 173. The cybersecurity modules 185 may include software components for implementing a security boundary, security gateway, and/or other software component for protecting the vehicle 174 from cyberattacks as described herein.

Figure 2:
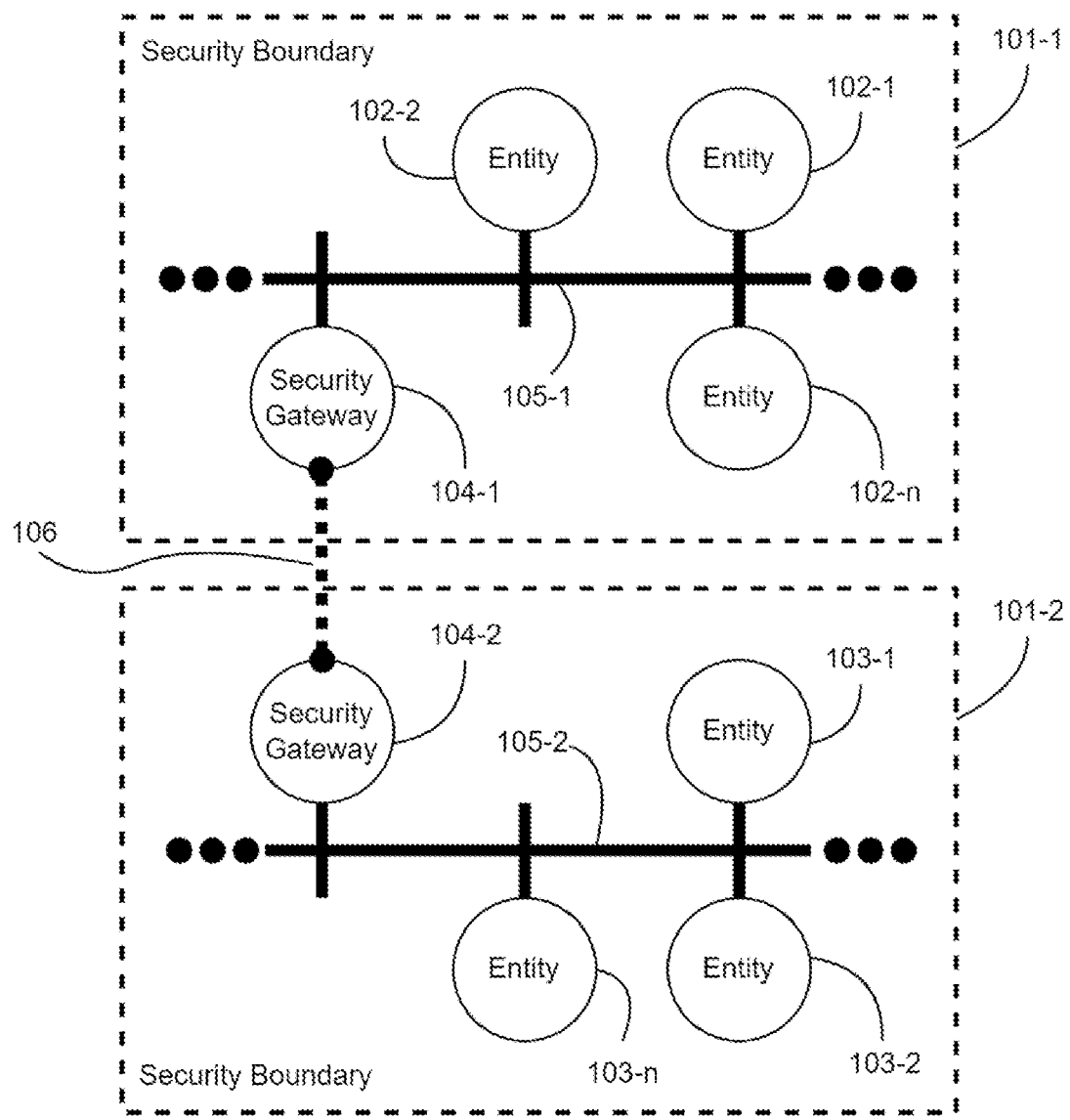
FIG. 2 is a block diagram that illustrates deployment of cybersecurity modules in connected vehicles in accordance with an embodiment of the present invention.

FIG. 2 is a block diagram that illustrates deployment of cybersecurity modules in connected vehicles in accordance with an embodiment of the present invention. In the example of FIG. 2, a plurality of entities 102 (i.e., 102-1, 102-2, . . . , 102-n) communicate over a network 105-1 within a security boundary 101-1. Similarly, a plurality of entities 103 (i.e., 103-1, 103-2, . . . 103-n) communicate over a network 105-2 within a security boundary 101-2.

The security boundaries 101-1 and 101-2 have corresponding security gateways 104-1 and 104-2, respectively. The security gateways 104-1 and 104-2 communicate with each other by way of a connection 106. The particulars of a network 105 and a connection 106 depend on the security boundary. For example, when the security boundary 101 is an ECU, the network 105 may be an internal bus of the ECU or inter-process communication channels for processes running in the ECU, and the connection 106 may be an in-vehicle network that allows for messaging in accordance with the Data Distribution Service (DDS) connectivity framework. Only two security boundaries are shown for clarity of illustration. In practice, a connected vehicle will have a plurality of security boundaries.

An entity may be a process or application program ("application") that is executed by a processor of an ECU. An entity may perform a specific task, and exchange messages with other entities by way of a defined messaging protocol, such as in accordance with the DDS connectivity framework or other middleware with message subscription/publication and service discovery capabilities. As a particular example, an entity may be implemented as a node of the Robot Operating System 2 (ROS2) using DDS as middleware to communicate with other nodes.

A security boundary is a strong segmentation that constrains a plurality of entities. For efficiency reasons, entities that perform related tasks are grouped within the same security boundary. As an example, entities that are implemented as ROS2 nodes are segregated or grouped together based on the frequency of ROS2/DDS messaging between the nodes.

Entities in a security boundary are constrained in the security boundary in that the entities can directly communicate with each other, but cannot directly communicate with other entities in other security boundaries. Put another way, an entity in a security boundary can directly communicate (e.g., send or receive messages) with entities in the same security boundary. However, an entity in a security boundary cannot directly communicate with entities in another security boundary. Referring to FIG. 2 as an example, the entities 102 can directly communicate with each other over the network 105-1. Similarly, the entities 103 can directly communicate with each other over the network 105-2. However, the entity 102-1 in the security boundary 101-1 cannot directly communicate with the entity 103-1 in the security boundary 101-2. Communications between the entity 102-1 and the entity 103-1 have to be transmitted through security gateways 104-1 and 104-2 over the connection 106 for inspection.

A security gateway is bound to a security boundary. Messages across security boundaries between entities can only be routed through corresponding interconnected security gateways. Communications between security gateways may be over a connection in accordance with a defined data transport protocol, such as in accordance with the DDS connectivity framework.

As an example, a message from the entity 102-1 to the entity 103-1 will be inspected by the security gateway 104-1. If the message passes inspection as per security policies for the security boundary 101-1, the security gateway 104-1 will forward the message to the security gateway 104-2 over the connection 106. The security gateway 104-2 will inspect the message originated by the entity 102-1 and, if the message passes inspection per security policies for the security boundary 101-2, the security gateway 104-2 will forward the message to the entity 103-1. The security gateway 104-1 and security gateway 104-2 will block the message if the message does not pass inspection as per security policies of their respective security boundaries.

A security gateway is implemented such that all messages exiting or entering the security boundary pass must through the security gateway for inspection. For example, when a security boundary is an ECU, the security gateway may be implemented in a network interface of the ECU that connects to other ECUs. As another example, when a security boundary is a segment of a network, the security gateway may be implemented in a router or gateway that connects the security boundary to other security boundaries. Yet another example, as will be more apparent in the example of FIG. 5, when a security boundary is a virtualized environment (e.g., a virtual machine or software container), the security gateway may be a process that connects the virtualized environment to other virtualized environments.

Figure 3:
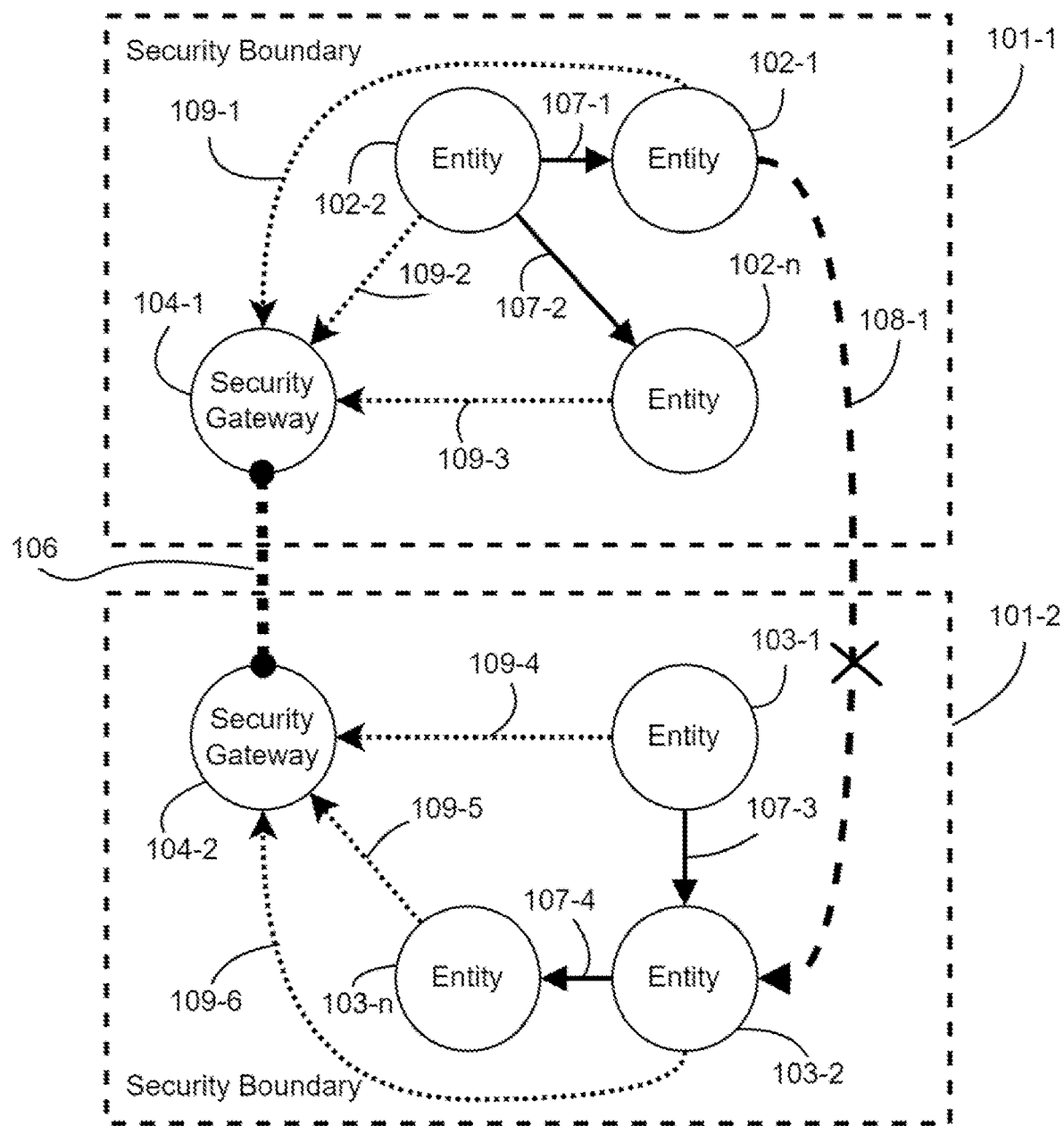
FIG. 3 is a block diagram that illustrates messaging flow in the deployment example of FIG. 2, in accordance with an embodiment of the present invention.

FIG. 3 is a block diagram that illustrates messaging flow in the deployment example of FIG. 2, in accordance with an embodiment of the present invention. A security gateway may learn the relationships between entities in the same security boundary by way of the messaging protocol employed by the entities to communicate. As a particular example, the security gateway may actively subscribe to receive particular messages between entities or passively listen to messages that are broadcasted by entities. This allows the security gateway to monitor topology changes in its security boundary and interactions between entities.

Referring to FIG. 3 as an example, inbound (i.e., within the same security boundary) messaging flows from the entity 102-2 to the entity 102-1 (see arrow 107-1) and from the entity 102-2 to the entity 102-n (see arrow 107-2) can be detected by the security gateway 104-1 (see arrows 109-1, 109-2, and 109-3) by subscribing to receive particular messages or passively listening to broadcast messages in accordance with the messaging protocol employed by the entities 102. The security gateway 104-2 detects (see arrows 109-4, 109-5, and 109-6) inbound messaging flows from the entity 103-1 to the entity 103-2 (see arrow 107-3) and from the entity 103-2 to the entity 103-n (see arrow 107-4) in similar fashion.

Outbound messaging flows that span from the security boundary 101-1 to the security boundary 101-2 are restricted and can only be transported by way of the connection 106 between the security gateways 104-1 and 104-2. In the example of FIG. 3, the entity 102-1 cannot send a message directly to the entity 103-2 (see blocked arrow 108-1). Such messaging flow across the security boundaries 101-1 and 101-2 can only be transported over the connection 106. Messaging restrictions between security boundaries may be enforced in conjunction with hardware components (e.g., security gateway running in a gateway device that connects the security boundaries) or in conjunction with other software components (e.g., security gateway working with middleware connecting the security boundaries).

As can be appreciated, the security gateways 104-1 and 104-2 inspect inbound and outbound messages for cyber security purposes in conformance with zero trust principles. That is, unlike other cybersecurity measures that trust particular entities, the security gateways 104-1 and 104-2 inspect all messages passing through them for compliance with security policies.

Figure 4:
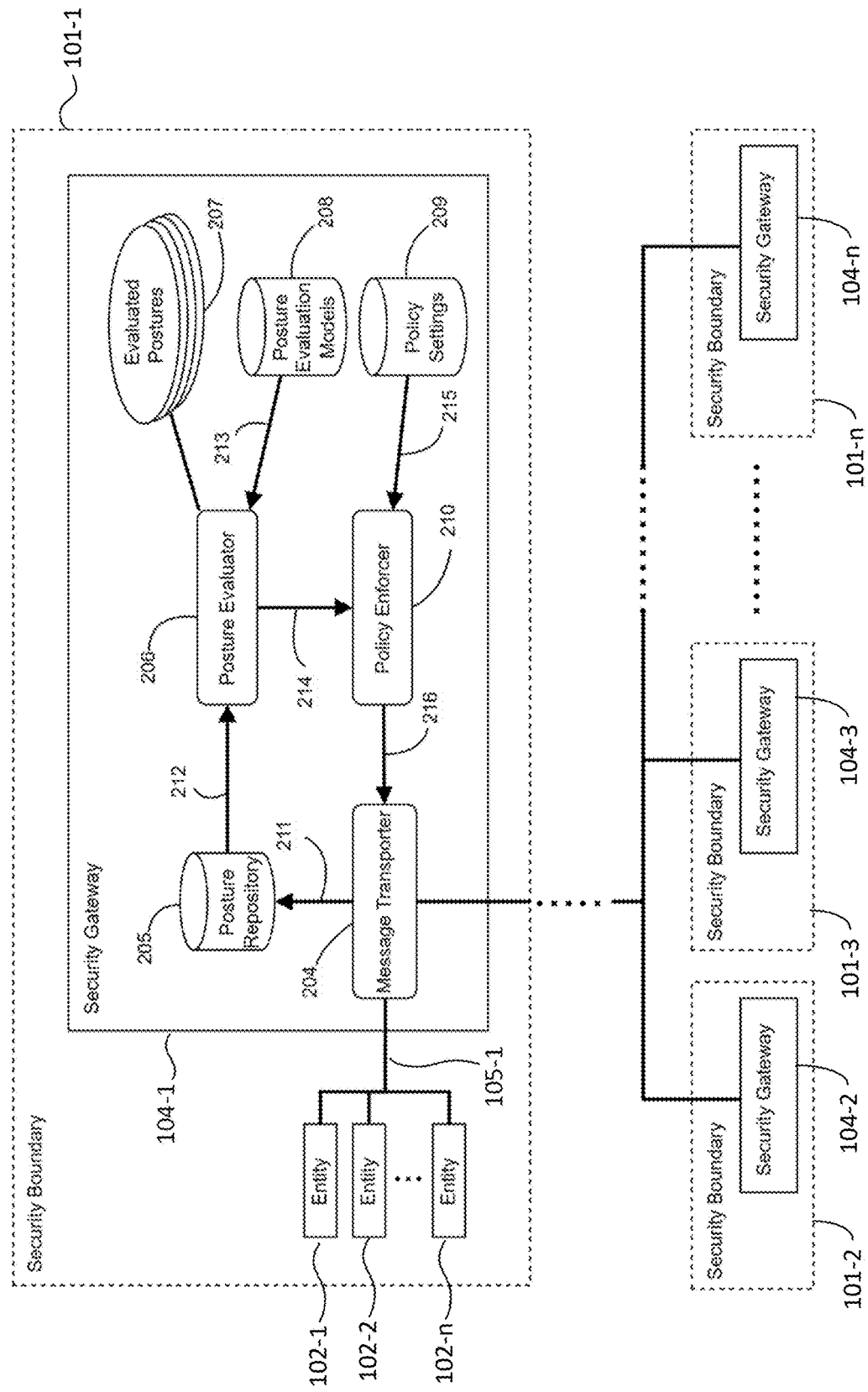
FIG. 4 is a block diagram of a security gateway in accordance with an embodiment of the present invention.

FIG. 4 is a block diagram of a security gateway in accordance with an embodiment of the present invention. A connected vehicle may have a plurality of security boundaries 101, with each security boundary 101 having a corresponding security gateway 104. The explanation of the security gateway 104-1 of the security boundary 104-1 given below also applies to the security gateways 104-2, 104-3, . . . , 104-n.

In the example of FIG. 4, the security gateway 104-1 includes a message transporter 204, a posture repository 205, a posture evaluator 206, a plurality of posture evaluation models 208, security policy settings 209, and a policy enforcer 210. In one embodiment, for efficiency, all of the aforementioned components of the security gateway 104-1 are deployed in the connected vehicle. Some components of the security gateway 104-1, such as the posture repository 205, posture evaluator 206, evaluated postures 207, and posture evaluation models 208, may be deployed in the cloud (e.g., automotive cybersecurity platform) depending on implementation details and available communication infrastructure.

A cybersecurity posture, which is also simply referred to herein as "posture", is the cybersecurity state of a security boundary. In one embodiment, the posture of a security boundary is based on the topology of the security boundary in terms of entities that are grouped in the security boundary, and interactions of entities in the security boundary with other entities that are in or external to the security boundary. A "baseline posture" is the known, normal cybersecurity state of the security boundary. The baseline posture of a security boundary may be determined by analyzing the topology of the security boundary and the interactions of the entities in the security boundary before the connected vehicle is delivered to a user; the baseline posture may be updated as components are added or modified. A security gateway detects and assess any change to the baseline posture, and performs a corrective action when the change is significant. For example, the security gateway may compare a target (i.e., being evaluated) posture to the baseline posture, and perform a corrective action when the difference between the target posture and the baseline feature is greater than a threshold.

In the example of FIG. 4, the message transporter 204 is attached to the network 105-1 that connects the entities 102. The message transporter 204 listens to broadcast messages and messages to or from the entities 102 to detect and collect posture information of the security boundary 101-1. Posture information includes topology changes and interactions of the entities 102. Topology changes include insertions of entities 102, deletions of entities 102, updates to the entities 102, and relationships of the entities 102. Interactions of the entities 102 include messaging flow directions, contents of messages, traffic shapes, messaging sequences, and messaging timing. An entity 102 may interact with other entities 102 or with other entities in other security boundaries.

In one embodiment, posture information is normalized as a vector ("posture vector") that follows a defined data schema, which in one embodiment uses conventions from the Vehicle Signal Specification (VSS). Features in a posture vector may indicate the type of the posture vector, the subtype of the posture vector, and the source of the posture vector. Table 1 below shows example posture vector type, posture vector subtype, posture vector source, and data.

TABLE 1

| Posture Vector Type | Posture Vector Subtype | Posture Vector Source | Example Data |
| --- | --- | --- | --- |
| Vehicle State | Status data | Safety System | Airbag/ADAS |
| | | Body System | Tire Pressure |
| | | Chassis System | Speed/Engine |
| | | Power System | RPM |
| | | | Fuel/Battery |
| | | | Break Pressure |
| | | | Gear Position |
| | | | Headlight |
| | | | Turn Signal |
| | Mobile service log | In-vehicle smart cabin | Infotainment content |
| | | Mobile APP/Services | |
| | | GNSS-GPS | Application/service log |
| | | | Location track |
| | Sensor environment variable | Radar/Lidar/Vision/Ultrasonic | Distance |
| | | V2X Exchange | Image |
| | | | Road Sign |
| Vehicle Control Record | Local Control | In-vehicle controller | Lock/unlock door event |
| | | | Engine start event |
| | Remote Command | In-vehicle Telematics Control Unit | Remote charging schedule |
| | | In-vehicle remote keyless entry system | Remote climate controls |
| | | | Near field unlock door |
| Vehicle threat intelligence | Known risk | Vulnerabilities database | CVE |
| | | Threat feed | Internal bug reports |
| | | Dark web sourcing | |
| Vehicle Cybersecurity Monitoring | In-vehicle security | Host protection | Security event |
| | | Network IDPS | Telemetry |
| | | Smart sensor | |
| | Cloud security | Telematics server | Security event |
| | | OTA server | Telemetry |
| | | Mobile APP server | |
| | | Fleet management server | |

Posture information that indicates the connected vehicle's state and control records may be obtained from in-vehicle (i.e., within the connected vehicle) entities. For example, status of the safety system, body system, chassis system, and power system may be detected from an entity in a corresponding ECU in the connected vehicle. Other posture information, such as vehicle threat intelligence or cybersecurity monitoring may be obtained from off-vehicle (i.e., external; outside the vehicle) sources, such as from an automotive cybersecurity platform. Other posture information, such as the topology of the security boundary and interactions of the entities may detected and collected by the message transformer 204 and normalized into a posture vector that facilitates comparison.

A baseline of posture vectors may be collected from connected vehicles that are known to be in a normal state (i.e., good; safe) or from the last good deployment of the cybersecurity modules. The posture evaluation models 208 may be created from the baseline posture vectors, such as by machine learning or statistics using the baseline posture vectors as samples or by employing detection rules that are based on the baseline posture vectors.

In one embodiment, the posture evaluation models 208 indicate a baseline topology, whitelisted operations, whitelisted status changes, normal sequences of events, normal event frequencies, normal field ranges, and normal risk score.

A baseline topology is the known, normal topology of a security boundary. The baseline topology may be determined before the connected vehicle is released to a user, and after an authorized change is made to the topology, such as adding new entities or modifying existing entities.

An entity may be expected to perform normal operations that can be whitelisted, i.e., presumed to be normal. An operation that is deemed to be normal may be assigned an identifier (ID) and included in a whitelist of operations. As a particular example, if the baseline posture vectors indicate that a first process in a first security boundary (e.g., ECU that monitors the engine) regularly sends engine status to a second process in a second security boundary (e.g., ECU of a safety monitor), this messaging regarding engine status may be whitelisted to identify it as a normal (and thus allowed) operation. Operations that are normal may be identified from the baseline posture vectors by statistics.

Whitelisted status changes are status changes that are deemed to be normal. An example of such normal status change may be use of a particular mobile app to remotely unlock a door. In that example, the change of door status from locked to unlocked is deemed to be normal and included in a whitelist of status changes. Such normal status changes may be determined from baseline posture vectors of vehicle record controls and vehicle states.

An event is a detectable occurrence or operation that may affect the posture of the connected vehicle. The baseline posture vectors may reveal a sequence of events that is deemed normal. Such normal sequence of events may be identified by, for example, machine learning (e.g., N-gram methodology) using the baseline posture vectors as training samples.

Normal event frequencies may be determined from the baseline posture vectors by statistics, e.g., by specifying a threshold frequency within a given duration. Similarly, normal field ranges may be determined from the baseline posture vectors by statistics to calculate the maximum/minimum boundaries of a payload.

A normal risk score may be calculated before a given connected vehicle is released to a user. A risk score is indicative of the cybersecurity risk posed to the connected vehicle. The calculation of a risk score depends on implementation details, and may be based on vulnerabilities affecting the connected vehicle (e.g., from a Common Vulnerabilities and Exposure (CVE) score), events detected in the vehicle (e.g., risk scores from an in-vehicle intrusion detection and prevention system), etc. The normal risk score may be an initial risk score calculated from vehicle threat intelligence and cybersecurity monitoring during test driving of the connected vehicle, for example.

Target (i.e., being evaluated) posture information may be evaluated using the posture evaluation models 208. More particularly, a target posture vector may be compared against the posture evaluation models 208 to detect if the target posture vector indicates a significant change to a normal posture as per the posture evaluation models 208. In one embodiment, a target posture vector may be evaluated in accordance with the following equations:

$$\text{Impact}_{TOTAL}=1-[(1-\text{Impact}_{MODEL1})\times$$
$$(1-\text{Impact}_{MODEL2})\times \quad . \quad . \quad . \quad \times$$
$$(1-\text{Impact}_{MODEL(N-1)})\times(1-\text{Impact}_{MODEL(N)})];$$

where $\text{Impact}_{MODEL}$ is $$= \sqrt{(p1-q1)^2 + (p2-q2)^2 + \cdots + (pi-qi)^2 + \cdots + (pn-qn)^2}$$
$$= \sqrt{\sum_{1}^{N}(pi-q1)^2}$$

and p, q are normalized to 1.

The $\text{Impact}_{MODEL}$ is a value calculated based on the posture evaluation models 208, and the $\text{Impact}_{TOTAL}$ is a value that is indicative of a change in the posture. In the above equations, p, q are two different column vectors; p is one set of 1~n characteristics (p1~pn), and q is another set of 1~n characteristics (q1~qn); p is the normal value from the baseline posture vectors; and q is the incoming (current) value. The $\text{Impact}_{TOTAL}$ may be compared to a threshold to determine if the posture change is significant. If the Impact $\text{Impact}_{TOTAL}$ is greater than the threshold, the posture change is significant and requires a corrective action. Otherwise, if the Impact $\text{Impact}_{TOTAL}$ is equal to or less than the threshold, the posture change is not significant and deemed to be normal.

In one embodiment, the $\text{Impact}_{TOTAL}$ is quantized into different rating levels to determine the corrective action to take, if any, in response to a posture change. For example, in Table 2 below, a rating ("Rating") is assigned based on the $\text{Impact}_{TOTAL}$ value ("Impact"), with the ratings going from None to Critical. A corresponding corrective action ("Corrective Action") is taken according to the rating level.

TABLE 2

| Rating | Impact | Corrective Action |
|---|---|---|
| None | 0.00 | No Action |
| Low | 0.1-0.39 | No Action |
| Medium | 0.4-0.69 | Pass Inspection/Notification |
| High | 0.7-0.89 | Pass Inspection/Investigate |
| Critical | 0.9-1.0 | Block |

Continuing the discussion of FIG. 4, posture information collected by the message transformer 204 are stored in a posture repository 205 (see arrow 211). In one embodiment, posture information is normalized into posture vectors as stored in the posture repository 205. The posture evaluator 206 evaluates the posture vectors (see arrow 212) using the posture evaluation models 208 (see arrow 213). The evaluation process compares a target posture vector to corresponding baseline posture vectors represented by the evaluation models 208 to determine if the target posture vector is significantly different to a corresponding baseline posture vector. Evaluated posture vectors may be ranked in terms of severity (e.g., from none to critical, as in Table 2 above) and arranged into groups 207 of evaluated postures, e.g., according to the ranking.

The policy enforcer 210 receives the result of the evaluation of a target posture vector from the posture evaluator 206 (see arrow 214) and performs corrective action, if any, in accordance with security policy settings 209 (see arrow 215). For example, the security policy settings 209 may indicate blocking an incoming message that that has a corresponding target posture vector that is rated as critical. In that case, when the posture evaluator 206 indicates that the target posture vector is rated as critical, the policy enforcer 210 signals the message transporter 204 (see arrow 216) to block the incoming message from entering the security boundary 101-1.

It is to be noted that the message transporter 204 may continuously monitor the topology of the security boundary 104-1. Upon detecting a change in the topology, e.g., an entity 102-1 is added or removed, the posture evaluator 206 may compare the new topology to the baseline topology to determine if the topology change is significant as per the security policy settings 209. For example, the security policy settings 209 may prohibit removing or adding a certain number of entities 102, may prohibit removing or adding a particular entity 102, etc. If the new topology varies from the baseline topology in a way that is prohibited by the security policy settings 209, the posture evaluator 206 may signal the policy enforcer 210 to block a newly added entity, raise an alert, or perform other corrective action.

A security boundary may be an ECU, a subsystem of an ECU, a virtualized environment (e.g., virtual machine or software container), or some other homogenous domain wherein corresponding entities and security gateway can directly communicate. For example, a security boundary may be a virtualized environment, and the entities constrained by the security boundary are processes running in the virtualized environment as now explained with reference to FIG. 5.

Figure 5:
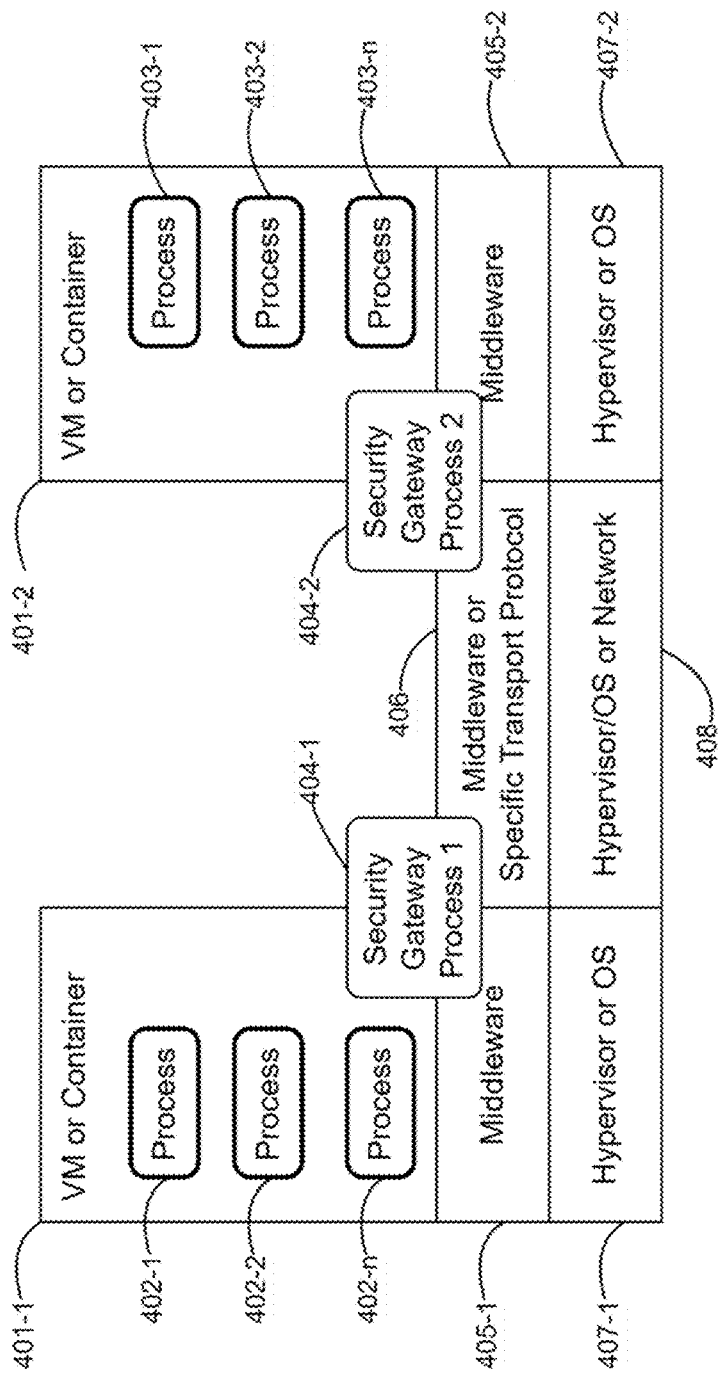
FIG. 5 is a block diagram that illustrates deployment of cybersecurity modules in connected vehicles in accordance with another embodiment of the present invention.

FIG. 5 is a block diagram that illustrates deployment of cybersecurity modules in connected vehicles in accordance with another embodiment of the present invention. In the example of FIG. 5, a virtualized environment 401-1 and a virtualized environment 401-2 each serves as a security boundary, and the processes 402 (i.e., 402-1, 402-1, . . . , 402-n) and 403 (i.e., 403-1, 403-2, . . . , 403-n) are entities that run in their corresponding virtualized environment. The processes 402 and 403 may communicate with other processes within their respective security boundaries over a local virtual network (e.g., virtual Ethernet). A virtualized environment may be a virtual machine or a software container.

A process 404-1 running in the virtualized environment 401-1 serves as a security gateway in the virtualized environment 401-1, and a process 404-2 serves as a security gateway in the virtualized environment 401-2. A process that serves as a security gateway is also referred to herein as a "security gateway process". A security gateway process may have the same component and functionality as the previously described security gateway 104, with components that employ virtual resources of the corresponding virtualized environment, such as virtual storage and virtual network adapters.

A process can directly communicate with other processes in the same virtualized environment. However, a message from a process in one virtualized environment can only be transported to a process in another virtualized environment through a connection between security gateway processes of the two virtualized environments. Referring to FIG. 5 as an example, a process 402-1 can directly exchange messages with a process 402-2 in the same virtualized environment 401-1. Similarly, a process 403-1 can directly exchanges messages with a process 403-2 in the same virtualized environment 401-2. However, messages between processes in different virtualized environments have to be transported through a connection between the security gateway process 404-1 and security gateway process 404-2. The connection between the security gateway processes 404-1 and 404-2 is by their middleware running in a corresponding hypervisor or operating system ("hypervisor/OS") (middleware 405-1 and hypervisor/OS 407-1 for the virtualized environment 401-1; middleware 405-2 and hypervisor/OS 407-2 for the virtualized environment 401-2), specific transport protocol via a network as represented by a functional block 406, or by their hypervisor/OS or over a network as represented by a functional block 408. The particulars of communications between security boundaries depend on the virtualization platform.

Figure 6:
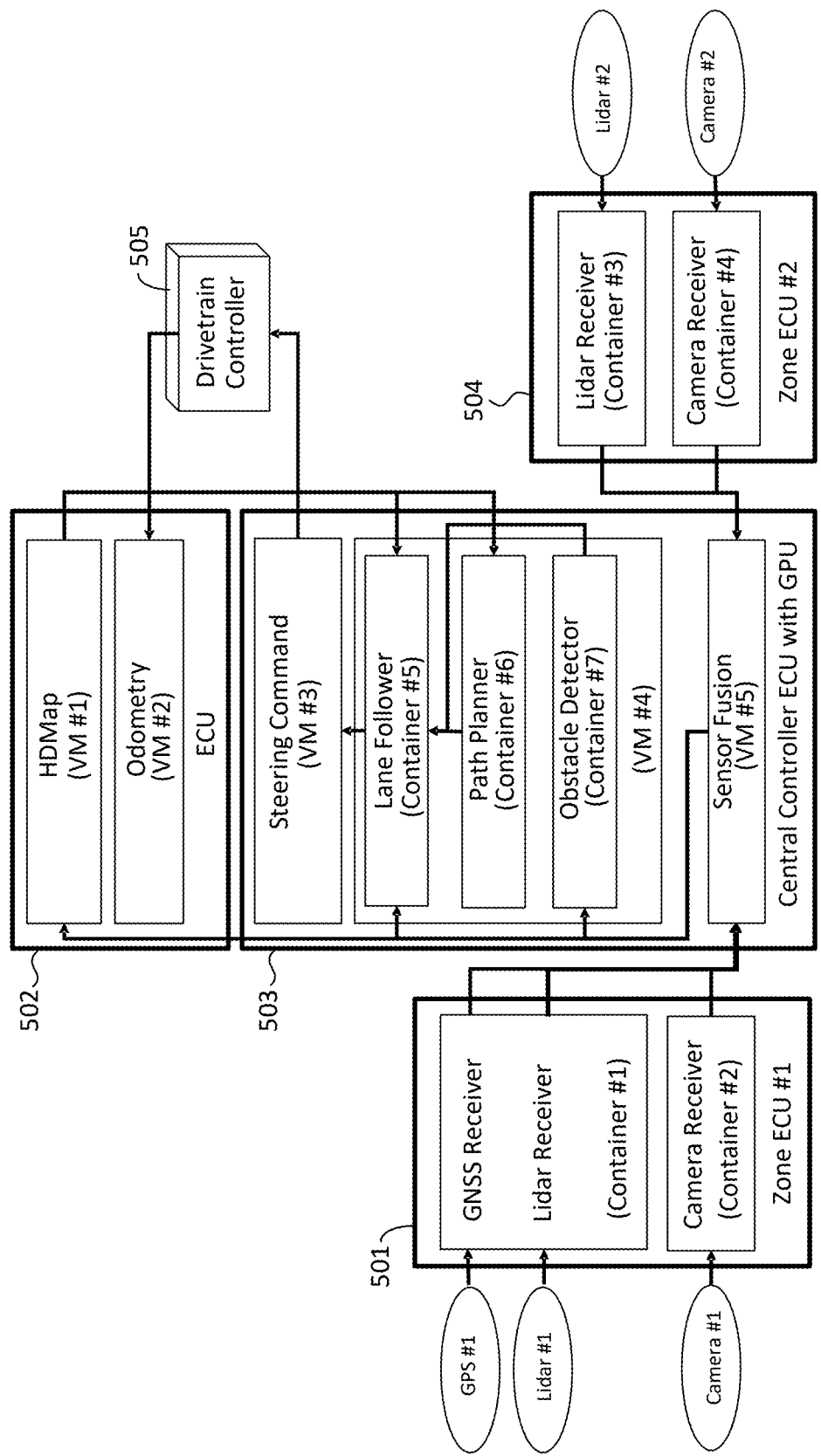
FIG. 6 is a block diagram that illustrates segmentation of entities into separate security boundaries in accordance with an embodiment of the present invention.

FIG. 6 is a block diagram that illustrates segmentation of entities into separate security boundaries in accordance with an embodiment of the present invention. The example of FIG. 6 shows components of a connected vehicle that are responsible for autonomous valet parking. As can be appreciated, embodiments of the present invention may be employed to secure other functionalities of a connected vehicle.

In the example of FIG. 6, an ECU 501 hosts a Container #1 as a first security boundary and a Container #2 as a second security boundary. The Container #1 has a GNSS Receiver process that receives GPS #1 (a GPS signal) and a Lidar Receiver process that receives Lidar #1 (a LIDAR signal). The Container #2 has a Camera Receiver process that receives Camera #1 (an image signal). An ECU 504 hosts a Container #3 as a first security boundary and a Container #4 as a second security boundary. The Container #3 has a Lidar Receiver process that receives Lidar #2 (a LIDAR signal), and the Container #4 has a Camera Receiver process that receives Camera #2 (an image signal). The ECUs 501 and 504 cover different sensing zones of the connected vehicle.

An ECU 502 hosts a virtual machine (VM) #1 as a first security boundary and a VM #2 as a second security boundary. The VM #1 has a High-Definition (HD) Map process, and the VM #2 has an Odometry process.

An ECU 503 hosts a VM #3 as a first security boundary, a VM #4 as a second security boundary, and a VM #5 as a third security boundary. The VM #3 has a Steering Command process. The VM #5 has a Sensor Fusion process. The VM #4 has a Container #5 that has a Lane Follower process, a Container #6 that has a Path Planner process, and a Container #7 that has an Obstacle Detector process. Each of the Container #5, Container #6, and Container #7 is a separate security boundary within the VM #4. The ECU 503 is a central controller ECU with a graphics processing unit (GPU) for added computing power.

It is to be noted that the tasks of the aforementioned processes of FIG. 6 are well-known in the art of connected vehicles and are thus only briefly discussed here. In the example of FIG. 6, the GNSS Receiver, Lidar Receiver, and Camera Receiver processes process Timing and Positioning data from a GNSS signal, Lidar point cloud from Lidar signals, and camera images, respectively, for use by the Sensor Fusion process. The Lane Follower process uses the outputs of the HD Map process, Path Planner process and Obstacle Detector process to generate a corresponding steering command that is input to a drivetrain controller 505 of the connected vehicle. The Lane Follower process uses the latest position and pose of the connected vehicle. The HD Map process uses the last position of the vehicle to output point cloud data structures about the local map and the surrounding fixed objects. The Obstacle Detection process processes the filtered output of the Camera Receiver process.

In the example of FIG. 6, each process is a ROS2 node. Nodes that perform related tasks are grouped together in the same VM or Container. The grouping or segregation of the ROS2 nodes may be based on the frequency and efficiency of ROS2/DDS messaging between the nodes. Nodes in the same security boundary may communicate with each other based on the ROS2/DDS messaging protocols (topic publish/subscription).

In the example of FIG. 6, a security gateway process (not shown) in each security boundary behaves as a ROS2/DDS node that monitors/subscribes to all the topics of the relevant nodes in the same security boundary. The security gateway process acts as an agent process that is responsible for: (1) propagating DDS message routing information and security rule/policy between the security gateway processes; (2) logging/relaying/dropping the ROS2/DDS messages based on relevant security policies; and (3) collecting posture information and uploading the posture information to the cloud (e.g., automotive cybersecurity platform). The posture information includes the topology of the nodes in each security boundary, and relationship between entities in security boundaries (which may be in a predefined access control list and hierarchy).

Each security gateway process communicates with other security gateway processes by way of a suitable data transport protocol. The data transport protocol may be ROS2/DDS topic publish/subscribe protocols, Scalable Service-Oriented Middleware over Internet Protocol (SOME/IP), proprietary protocols, or TCP/SSL channels, for example.

Figure 7:
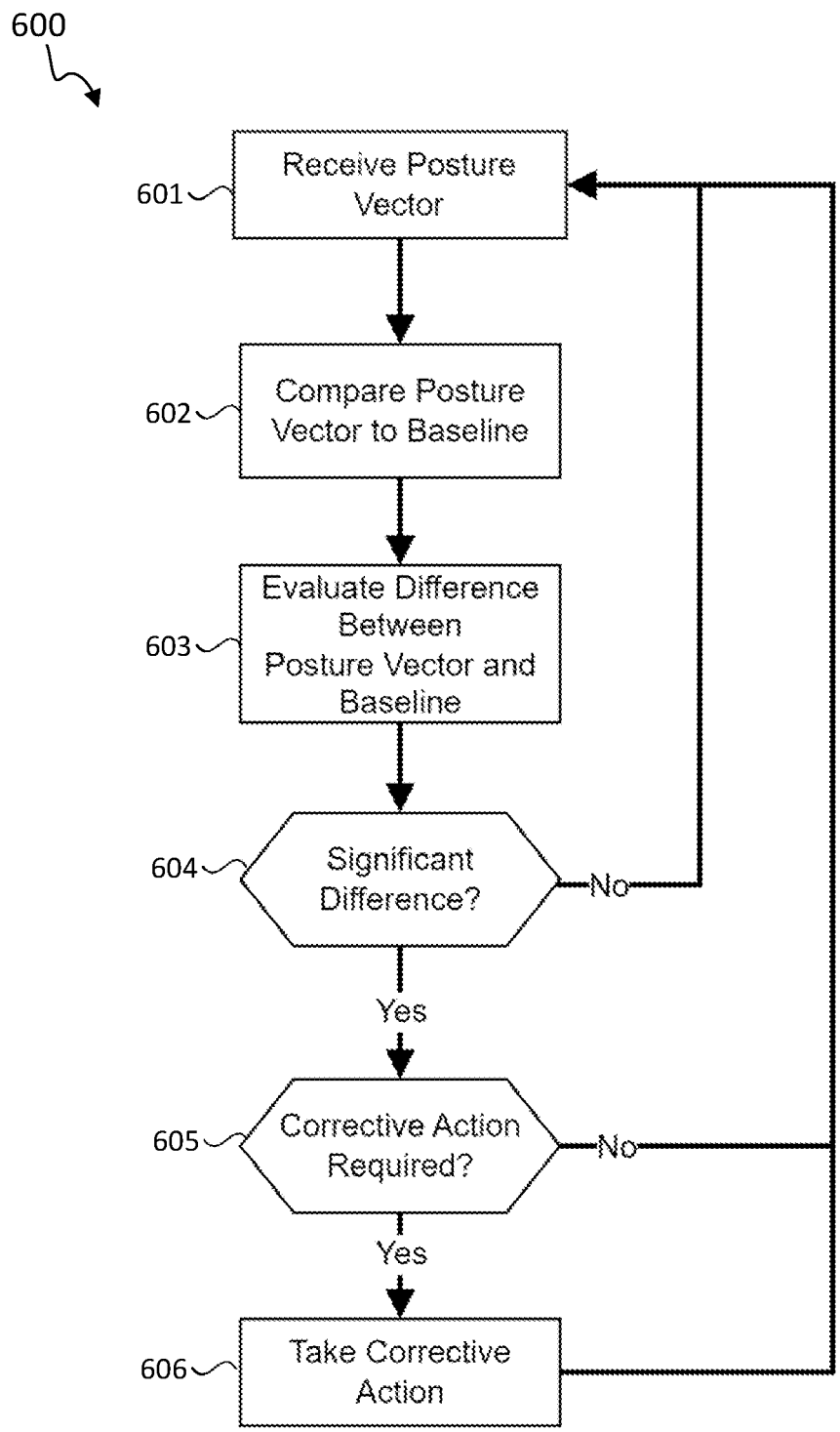
FIG. 7 is a flow diagram of a method of detecting abnormal operations in a connected vehicle in accordance with an embodiment of the present invention.

FIG. 7 is a flow diagram of a method 600 of detecting abnormal operations in a connected vehicle in accordance with an embodiment of the present invention. The method 600 may be performed by a security gateway of a security boundary as previously disclosed. As can be appreciated, other components may also be employed without detracting from the merits of the present invention.

In the example of FIG. 7, a security gateway of a security boundary receives a message that is entering or exiting the security boundary, and normalizes the content of the message into a a target posture vector (step 601). The security gateway compares the target posture vector to a corresponding baseline posture vector to identify differences between the target posture vector and corresponding baseline posture vector (602). The security gateway evaluates the difference to determine if the target posture vector is significantly different from the baseline posture vector (step 603), e.g., by comparing an impact value calculation of the target posture vector to a threshold. If there is no significant difference between the target posture vector and the corresponding baseline posture vector, i.e., the target message does not cause a significant posture change, the security gateway simply continues to receive and inspect messages that are entering or exiting the security boundary (step 604 to step 601).

Otherwise, if the difference between the target posture vector and the corresponding baseline posture vector is significant, the security gateway determines if a corrective action is required (step 604 to step 605). If no corrective action is required, the security gateway continues to receive and inspect messages that are entering or exiting the security boundary (step 605 to step 601). Otherwise if corrective action is required (step 605 to step 606), e.g., the difference results in a medium or higher rating, the security gateway performs corrective action against the target message. The corrective action may include blocking the target message, allowing the message to pass but alerting information technology (IT) personnel to investigate the message, allowing the message to pass and notifying IT personnel of the message (e.g., recording in a log), etc.

Figure 8:
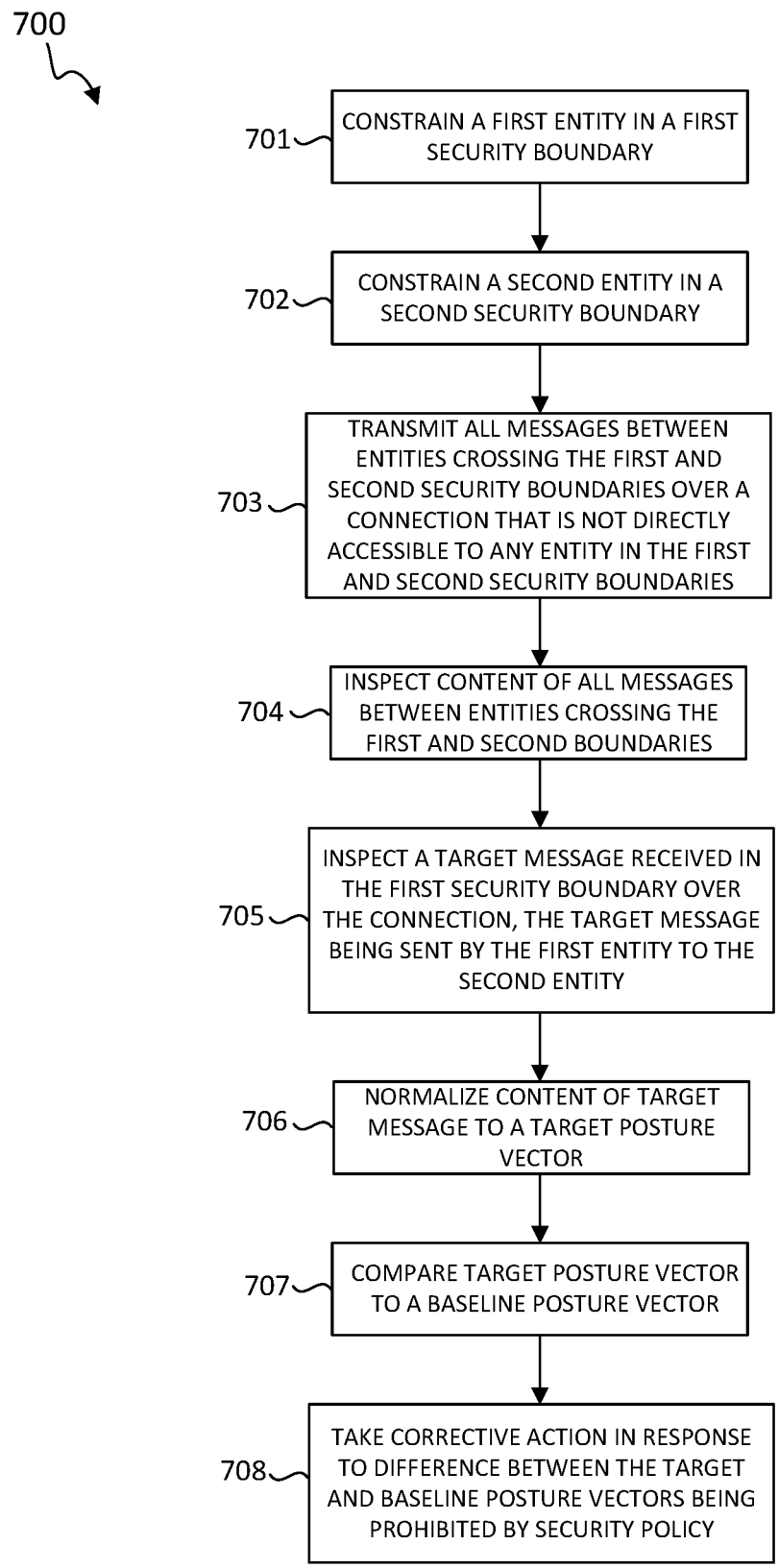
FIG. 8 is a flow diagram of a method of detecting abnormal operations in a connected vehicle in accordance with an embodiment of the present invention.

FIG. 8 is a flow diagram of a method 700 of detecting abnormal operations in a connected vehicle in accordance with an embodiment of the present invention. The method 700 may be performed by a connected vehicle in conjunction with the connected vehicle's ECUs and cybersecurity modules.

In the example of FIG. 8, a first entity is constrained in a first security boundary (step 701). The first entity is constrained in that it can directly communicate with other entities that are also constrained in the first security boundary but not with other entities constrained in a different security boundary. The first security boundary may be an ECU or a virtualized environment hosted by an ECU, such as a virtual machine or a software container. The first entity may be a process executed by a processor of the ECU or a process running in the virtualized environment.

A second entity is constrained in a second security boundary (step 702). The second entity is constrained in that it can directly communicate with other entities that are also constrained in the second security boundary but not with other entities constrained in a different security boundary. The second security boundary may be an ECU or a virtualized environment hosted by an ECU, such as a virtual machine or a software container. The second entity may be a process executed by a processor of the ECU or a process running in the virtualized environment.

All messages between entities crossing the first and second security boundaries are transmitted over a connection that is not directly accessible to any entity that is constrained in the first and second security boundaries (step 703). This prevents an entity in a security boundary to send a message to another entity in another security boundary without the message having to go through the connection for inspection. That is, all messages crossing the first and second security boundaries between entities are inspected for compliance with security policies (step 704).

A target message received in the first security boundary over the connection is inspected, with the target message being sent by the first entity to the second entity (step 705). As part of the inspection, the content of the target message is normalized to a target posture vector that indicates a current operation involving the first entity (step 706), and the target posture vector is compared to a baseline posture vector (step 707). The baseline posture vector indicates a known good operation involving the first entity. A corrective action is taken in response to the difference between the target posture vector and the baseline posture vector being prohibited by a security policy of the second security boundary (step 708). For example, the difference between the target posture vector and the baseline posture vector may be expressed in terms of a numerical value that is compared against a numerical threshold, and a corrective action is taken when the difference exceeds the threshold as per the security policy. As can be appreciated, the threshold may also be a rating level or some other reference.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A connected vehicle comprising:
a first electronic control unit (ECU) of a plurality of ECUs of the connected vehicle, the first ECU comprising a processor and a memory, the memory of the first ECU storing instructions that when executed by the processor of the first ECU cause the first ECU to constrain a first set of entities that are running in the first ECU to within a first security boundary that includes a first security gateway; and
a second ECU of the plurality of ECUs of the connected vehicle, the second ECU comprising a processor and a memory, the memory of the second ECU storing instructions that when executed by the processor of the second ECU cause the second ECU to:
constrain a second set of entities that are running in the second ECU to within a second security boundary that includes a second security gateway;
receive all messages between entities that are transmitted across the first and second security boundaries over a connection that is not directly accessible to any entity of the first and second sets of entities, wherein the connection is between the first and second security gateways;
receive over the connection a target message for inspection, the target message being sent by a first entity of the first set of entities to a second entity of the second set of entities;
normalize a content of the target message to a target posture vector, the target posture vector indicating a current operation involving the second entity;
compare the target posture vector to a corresponding baseline posture vector, wherein the corresponding baseline posture vector indicates a known good operation involving the second entity;
determine a difference between the target posture vector and the corresponding baseline posture vector; and
take a corrective action against the target message in response to determining that the difference between the target posture vector and the corresponding baseline posture vector indicates a change in cybersecurity posture that is prohibited by a security policy.

2. The connected vehicle of claim 1, wherein entities of the first set of entities communicate with each other over an internal network of the first ECU.

3. The connected vehicle of claim 1, wherein the first security boundary is a first virtual machine that is hosted by the first ECU, and each of the first set of entities is a process that is running in the first virtual machine.

4. The connected vehicle of claim 3, wherein entities of the first set of entities communicate with each other over a virtual network.

5. The connected vehicle of claim 3, wherein the second security boundary is a second virtual machine that is hosted by the second ECU, and each of the second set of entities is a process that is running in the second virtual machine.

6. The connected vehicle of claim 3, wherein the second security boundary is a software container, and each of the second set of entities is a process that is running in the software container.

7. A method of detecting abnormal operations in connected vehicles, the method comprising:
constraining a first entity in a first security boundary that includes a first security gateway, the first entity being executed in a first electronic control unit (ECU) of a plurality of ECUs of a connected vehicle;
constraining a second entity in a second security boundary that includes a second security gateway, the second entity being executed in a second ECU of the plurality of ECUs of the connected vehicle;
routing all messages that are transmitted across the first and second security boundaries between entities over a connection that is not directly accessible to all entities constrained in the first and second security boundaries, wherein the connection is between the first and second security gateways;
receiving, over the connection, a target message in the second security boundary for inspection, the target message being sent by the first entity to the second entity;
normalizing a content of the target message to a target posture vector, the target posture vector indicating a current operation involving the second entity;
comparing the target posture vector to a corresponding baseline posture vector, wherein the corresponding baseline posture vector indicates a known good operation involving the second entity; and
taking a corrective action against the target message in response to determining that a difference between the target posture vector and the corresponding baseline posture vector indicates a change that is prohibited by a security policy.

8. The method of claim 7, wherein the first security boundary is a first virtual machine that is hosted by the first ECU, and the first entity is a process running in the first virtual machine.

9. The method of claim 8, wherein the second security boundary is a second virtual machine that is hosted by the second ECU, and the second entity is a process running in the second virtual machine.

10. The method of claim 7, wherein the first security boundary is a software container, and the first entity is a process running in the software container.

11. The method of claim 7, wherein the first entity and other entities constrained in the first security boundary communicate with each other over an internal network of the first ECU.

12. A method of detecting abnormal operations in connected vehicles, the method comprising:
constraining a first entity in a first virtualized environment that is hosted by a first electronic control unit (ECU) of a plurality of ECUs of a connected vehicle, wherein messages entering or exiting the first virtualized environment are inspected by a first security gateway process;
constraining a second entity in a second virtualized environment that is hosted by a second ECU of the plurality of ECUs of the connected vehicle, wherein messages entering or exiting the second virtualized environment are inspected by a second security gateway process;

routing all messages that are transmitted across the first and second virtualized environments between entities over a connection that is not directly accessible to any entity that is constrained in the first virtualized environment or the second virtualized environment, wherein the connection is between the first and second security gateway processes;

receiving, over the connection, a target message in the second virtualized environment for inspection, the target message being sent by the first entity to the second entity;

normalizing a content of the target message to a target posture vector, the target posture vector indicating a current operation involving the second entity;

comparing the target posture vector to a corresponding baseline posture vector, wherein the corresponding baseline posture vector indicates a known good operation involving the second entity; and taking a corrective action against the target message in response to determining that a difference between the target posture vector and the corresponding baseline posture vector indicates a change that is prohibited by a security policy.

13. The method of claim 12, wherein the first virtualized environment is a first virtual machine that is hosted by the first ECU, and the first entity is a process running in the first virtual machine.

14. The method of claim 13, wherein the second virtualized environment is a second virtual machine that is hosted by the second ECU, and the second entity is a process running in the second virtual machine.

15. The method of claim 13, wherein the second virtualized environment is a software container that is hosted by the second ECU, and the second entity is a process running in the software container.

\* \* \* \* \*